US012661669B2

(12) United States Patent
Smith et al.

(10) Patent No.: US 12,661,669 B2
(45) Date of Patent: Jun. 23, 2026

(54) OSCILLATING WAND BIDET

(71) Applicant: Kohler Co., Kohler, WI (US)

(72) Inventors: Michael Smith, Sheboygan, WI (US); Andrew Smith, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 197 days.

(21) Appl. No.: 18/374,961

(22) Filed: Sep. 29, 2023

(65) Prior Publication Data

US 2024/0116063 A1 Apr. 11, 2024

Related U.S. Application Data

(60) Provisional application No. 63/413,394, filed on Oct. 5, 2022.

(51) Int. Cl.
*B05B 3/16* (2006.01)
*E03D 9/08* (2006.01)

(52) U.S. Cl.
CPC . *B05B 3/16* (2013.01); *E03D 9/08* (2013.01)

(58) Field of Classification Search
CPC .................................... B05B 3/16; E03D 9/08
USPC .................................. 4/448, 447, 443, 420.4
See application file for complete search history.

(56) References Cited

U.S. PATENT DOCUMENTS 1,612,665 A * 12/1926 Tivoli ....................... E03D 9/08 4/445
1,990,578 A * 2/1935 Zorraquin ................. E03D 9/08 4/420.5
5,201,080 A * 4/1993 Tanaka ...................... E03D 9/08 4/443
5,210,885 A * 5/1993 Ruo .......................... E03D 9/08 4/420.4
5,933,881 A * 8/1999 Smith ........................ E03D 9/08 4/420.4
7,191,473 B2 * 3/2007 Matsumoto ............... E03D 9/08 4/420.4
9,068,332 B2 * 6/2015 Pace .......................... E03D 9/08
9,096,997 B2 * 8/2015 Mochita .................... E03D 9/08
9,125,792 B2 * 9/2015 Ji ....................... A61H 33/6021
9,283,144 B2 * 3/2016 Bickerstaffe ........... A61H 35/00
9,428,898 B1 * 8/2016 Clements .................. E03D 9/08
9,528,254 B2 * 12/2016 Kuang ...................... E03D 9/08
9,828,755 B1 * 11/2017 Clements .................. E03D 9/08
9,957,704 B2 5/2018 Gupta et al.
10,301,808 B2 5/2019 Willers
10,954,660 B2 3/2021 Ko et al.
11,347,354 B1 * 5/2022 clements ................ G02B 30/56
(Continued)

FOREIGN PATENT DOCUMENTS

CA 2201177 A1 * 9/1998 ............... E03D 9/08
CN 102949141 A 3/2013
(Continued)

*Primary Examiner* — Lori L Baker
(74) *Attorney, Agent, or Firm* — Lempia Summerfield Katz LLC

(57) ABSTRACT

An oscillating bidet includes a housing configured to receive a flow of water and a bidet wand configured to oscillate under the flow of water. The housing includes a housing inlet configured to receive a flow of water and a housing outlet configured to dispense the flow of water. The housing further includes a chamber configured to direct the flow of water from the housing inlet to the housing outlet.

13 Claims, 12 Drawing Sheets

(56) References Cited

U.S. PATENT DOCUMENTS

| | | | | |
|---|---|---|---|---|
| 2004/0019962 | A1 * | 2/2004 | Sato | B05B 3/043 4/420.4 |
| 2012/0222207 | A1 * | 9/2012 | Slothower | E03D 9/085 4/443 |
| 2015/0240956 | A1 * | 8/2015 | Ramos De Barros | E03C 1/0408 4/443 |
| 2020/0399882 | A1 * | 12/2020 | Bailey | E03D 11/025 |
| 2021/0017752 | A1 | 1/2021 | Koga et al. | |
| 2024/0116063 | A1 * | 4/2024 | Smith | E03D 9/08 |
| 2024/0410153 | A1 * | 12/2024 | Fang | A47K 13/24 |
| 2025/0092957 | A1 * | 3/2025 | Smith | F03G 7/0614 |
| 2025/0101728 | A1 * | 3/2025 | Kim | B08B 9/00 |

FOREIGN PATENT DOCUMENTS

| | | | | | |
|---|---|---|---|---|---|
| CN | 202891787 | U | | 4/2013 | |
| CN | 213805689 | U | | 7/2021 | |
| CN | 119021334 | A | * | 11/2024 | F03B 13/00 |
| CN | 119332781 | A | * | 1/2025 | E03D 9/16 |
| EP | 4316325 | A1 | * | 2/2024 | A47K 13/26 |
| ES | 2831778 | T3 | * | 6/2021 | E03D 9/08 |
| ES | 2879902 | T3 | * | 11/2021 | E03D 9/08 |
| WO | WO-9953150 | A1 | * | 10/1999 | E03D 9/08 |
| WO | WO-0222971 | A1 | * | 3/2002 | E03D 9/05 |
| WO | WO-2007139163 | A1 | * | 12/2007 | A47K 10/48 |
| WO | 2013058575 | A2 | | 4/2013 | |
| WO | 2016045021 | A1 | | 3/2016 | |
| WO | 2019118575 | A1 | | 6/2019 | |
| WO | WO-2020232290 | A1 | * | 11/2020 | H04N 23/57 |
| WO | 2020253425 | A1 | | 12/2020 | |
| WO | 2021241196 | A1 | | 12/2021 | |
| WO | WO-2021244461 | A1 | * | 12/2021 | A61H 33/0087 |
| WO | WO-2022262382 | A1 | * | 12/2022 | E03D 9/00 |

* cited by examiner

OSCILLATING WAND BIDET

This application claims priority benefit of Provisional Application No. 63/413,394 filed Oct. 5, 2022, which is hereby incorporated by reference in its entirety.

FIELD

The present disclosure relates to apparatuses, systems, and methods for oscillating a bidet wand. More specifically, the present disclosure relates to apparatuses, systems, and methods for oscillating a bidet wand using a water driven gear assembly.

BACKGROUND

A toilet may include a bidet to wash the underside of a user, thereby improving the user experience. A toilet may be manufactured with an integrated bidet, or a bidet may be added to a toilet after installation of the toilet. Some bidets may include electric motors to provide various features. However, a bidet including an electric motor requires a control circuit and a power supply, making it more difficult to and install and increasing the number of failure points in the bidet. Accordingly, there is a need for a bidet including various automated features without requiring an electric motor.

SUMMARY

In one embodiment, an oscillating bidet may include a housing configured to receive a flow of water, the housing including a gear assembly having a cam disposed outside of the housing and being configured to rotate the cam as a flow of water moves through the housing, a bidet wand housing including a wand housing water inlet, a bidet wand configured to extend from the bidet wand housing and having a bidet wand outlet in fluid communication with the wand housing water inlet, a conduit connecting the housing to the wand housing water inlet, and a cam arm having a first end coupled to the cam and a second end coupled to the bidet wand housing, the cam arm being configured to oscillate the bidet wand housing and the bidet wand between more than one use position as the cam rotates.

In some examples, the bidet wand outlet may be configured to dispense water as the bidet wand oscillates between more than one use position.

In some examples, the gear assembly may include a first shaft including a turbine and a first worm gear, a second shaft including a second worm gear and a spur gear interlocked with the first worm gear, and a third shaft including the cam and a second spur gear interlocked with the second worm gear and the turbine may be configured to be rotated by a flow of water through the housing.

In some examples, the first shaft may be configured to rotate along a first axis of rotation, the second shaft may be configured to rotate about a second axis of rotation, and the third shaft may be configured to rotate about a third axis of rotation. The first and third axis of rotation may be parallel. The second axis of rotation may be perpendicular to the first and third axis of rotation.

In some examples, the oscillating bidet may include a nut and a bolt configured to couple the cam to the cam arm.

In some examples, the cam arm may include a slot formed therein and the bolt may be configured to move within the slot as the cam rotates.

In some examples, the cam includes a cam axis of rotation about which the cam is configured to rotate.

In some examples, when a distance between the cam axis of rotation and the location at which the cam arm is coupled to the cam increases, a period of oscillation of the bidet wand increases.

In one embodiment, an oscillating bidet assembly includes a housing configured to receive a flow of water, the housing including a gear assembly configured to rotate a cam disposed outside of the housing as flow of water moves through the housing, a first valve configured to receive a flow of water from a water supply conduit, the first valve being operable to allow or prevent the flow from passing through the first valve, a second valve configured to divert the flow of water between the housing and a bypass conduit, a bidet wand housing including a bidet wand having a wand outlet, a check valve configured to receive a flow of water from the housing, the second valve configured to direct the flow of water to the bidet wand, and a cam arm having a first end coupled to the cam and a second end coupled to the bidet wand, the cam arm being configured to oscillate the bidet wand as the cam rotates.

In some examples, the wand water outlet may be configured to dispense water as the bidet wand oscillates between more than one use position.

In some examples, the first valve is operable to control a quantity of the flow of water through the first valve.

In some examples, the bidet assembly may include a first actuator configured to change an orientation of the first valve, a second actuator configured to change an orientation of the second valve. In some examples, changing the orientation of the first valve changes a quantity of the flow of water passing through the first valve.

In some examples, the second actuator may be to change the orientation of the second valve such that the flow of water is diverted to the bypass conduit causing the bidet wand to stop oscillating.

In some examples, the second actuator may be operable to change the orientation of the second valve such that the quantity of the flow of water diverted to the housing is reduced, increasing the period of oscillation of the bidet wand.

In some examples, the second actuator may be operable to change the orientation of the second valve such that the quantity of the flow of water diverted to the housing is increased, decreasing a period of oscillation of the bidet wand.

In some examples, the bidet assembly may include a first conduit connecting the first valve to the second valve, a second conduit connecting the second valve to the housing, a third conduit connecting the housing to the check valve, and a fourth conduit connecting the check valve to the bidet wand.

In one embodiment a toilet seat including an oscillating bidet includes a top surface, a bottom surface opposite the top surface, an inner edge where the top surface and the bottom surface meet, an outer edge where the top surface and the bottom surface, a housing configured to receive a flow of water, the housing including a gear assembly having a cam disposed outside of the housing and being configured to rotate the cam as a flow of water moves through the housing, a bidet wand housing including a wand housing water inlet, the bidet wand housing rotatably coupled to the bottom surface, a bidet wand configured to extend from the bidet wand housing and having a bidet wand outlet in fluid communication with the wand housing water inlet, a conduit connecting the housing to the wand housing water inlet, and a cam arm having a first end coupled to the cam and a second end coupled to the bidet wand housing, the cam arm being configured to oscillate the bidet wand housing and the bidet wand between more than one use position as the cam rotates.

In some examples, the housing may be coupled to the bottom surface.

In some examples, an end of the bidet wand housing may be rotatably coupled to the bottom surface.

In one embodiment, an oscillating bidet includes a housing configured to receive a flow of water, and a bidet wand configured to oscillate under the flow of water.

In some examples, the housing includes a housing inlet configured to receive a flow of water and a housing outlet configured to dispense the flow of water.

In some examples, the housing may include a chamber configured to direct the flow of water from the housing inlet to the housing outlet.

In some examples, the oscillating bidet may further include a gear assembly including a turbine disposed within the chamber of the housing.

In some examples, the turbine may be disposed within the chamber so as to rotate about an axis of rotation perpendicular to the flow of water through the chamber.

In some examples, the gear assembly may include a cam disposed outside of the housing configured to rotate about a cam axis of rotation and the gear assembly may be configured to transmit rotational energy from the turbine to the cam.

In some examples, the oscillating bidet may include a bidet wand housing including the bidet wand and a cam arm rotatably coupled to each of the cam and the bidet wand housing and configured to move with the cam as the cam rotates, oscillating the bidet wand housing and the bidet wand.

In some examples, the oscillating bidet may include a cam arm rotatably coupled to each of the cam and the bidet wand and configured to move with the cam as the cam rotates, oscillating the bidet wand.

In one embodiment, a method of oscillating a bidet includes receiving a flow of water at a housing and oscillating a bidet wand under the flow of water.

In some examples, the bidet wand oscillates between more than one use position.

In some examples, the method may include dispensing water from the bidet wand.

In some examples, water may be dispensed from the bidet wand as the bidet wand oscillates.

In some examples, the method may further include rotating a turbine disposed within the housing under the flow of water.

In some examples, the turbine may be rotated about an axis of rotation perpendicular to the flow of water through the housing.

In some examples, the method may include rotating a cam disposed outside of the housing using a gear assembly configured to transfer rotational energy from the turbine to the cam.

In some examples, the bidet wand may be oscillated by a cam arm rotatably coupled to each of the cam and a bidet wand housing including the bidet wand, the cam arm moving as the cam rotates and oscillating the bidet wand housing and the bidet wand.

In some examples, the bidet wand is oscillated by a cam arm rotatably coupled to the each of the cam and the wand housing, the cam arm moving as the cam rotates and oscillating the bidet wand.

In some examples, the method may include controlling a flow rate of water provided to the housing.

In one embodiment, an oscillating bidet includes a housing configured to receive a flow of water, the housing including a gear assembly configured to rotate a cam as a flow of water moves through the housing, a bidet wand having a wand outlet, and a cam arm having a first end coupled to the cam and a second end coupled to the bidet wand, the cam arm being configured to oscillate the bidet wand as the cam rotates.

In some examples, the wand outlet may be configured to dispense water as the bidet wand oscillates between more than one use position.

In some examples, the bidet assembly may include a first valve configured to control a flow of water to the housing.

In some examples, the bidet assembly may include a bypass conduit and a second valve configured to selectively divert a flow of water to the bypass conduit.

BRIEF DESCRIPTION OF THE DRAWINGS

Objects, features, and advantages of the present disclosure should become more apparent upon reading the following detailed description in conjunction with the drawing figures, in which:

FIG. 1 illustrates a toilet including a tank and FIG. 2 illustrates a tankless toilet according to exemplary embodiments of the present disclosure.

The figures illustrate certain exemplary embodiments of the present disclosure in detail. It should be understood that the present disclosure is not limited to the details and methodology set forth in the detailed description or illustrated in the figures. It should be understood that the terminology used herein is for the purposes of description only and should not be regarded as limiting.

DETAILED DESCRIPTION

Described herein are apparatuses, systems, and methods for oscillating a bidet wand. The apparatuses, systems, and methods disclosure herein use a water driven gear assembly to oscillate or move a bidet wand. An oscillating bidet according to the present disclosure may oscillate the bidet wand through more than one use position. An oscillating bidet according to the present disclosure may dispense water as the bidet oscillates through more than one use position. In some examples, a position (e.g., use position) of the oscillating bidet may be fixed by the user. An oscillating bidet according to the present may more effectively clean a user, improving user experience, without requiring electronic components.

In some examples, an oscillating bidet according to the present disclosure may be manufactured and included as an integral component of a toilet. For example, an oscillating bidet may be included in a toilet seat or a base (e.g., pedestal) of the toilet. In other examples, an oscillating bidet according to the present disclosure may be manufactured separately from and attached to a toilet. For example, a bidet assembly may be attached to a toilet seat or base of the toilet. In some examples, an oscillating bidet according to the present disclosure may be manufactured independently of a toilet and attached to a toilet after the toilet has already been installed.

Referring generally to the figures, an oscillating bidet according to present disclosure includes a housing configured to receive a flow of water. The bidet assembly further includes a gear assembly within the housing including a turbine disposed in a chamber through which a flow of water travels through the housing. The turbine transmits rotation force through the gear assembly to a cam disposed outside of the housing. The cam is connected to a bidet wand housing via a cam arm. The cam arm is configured to oscillate the bidet wand housing and thus the bidet wand as the cam rotates.

Figure 2:
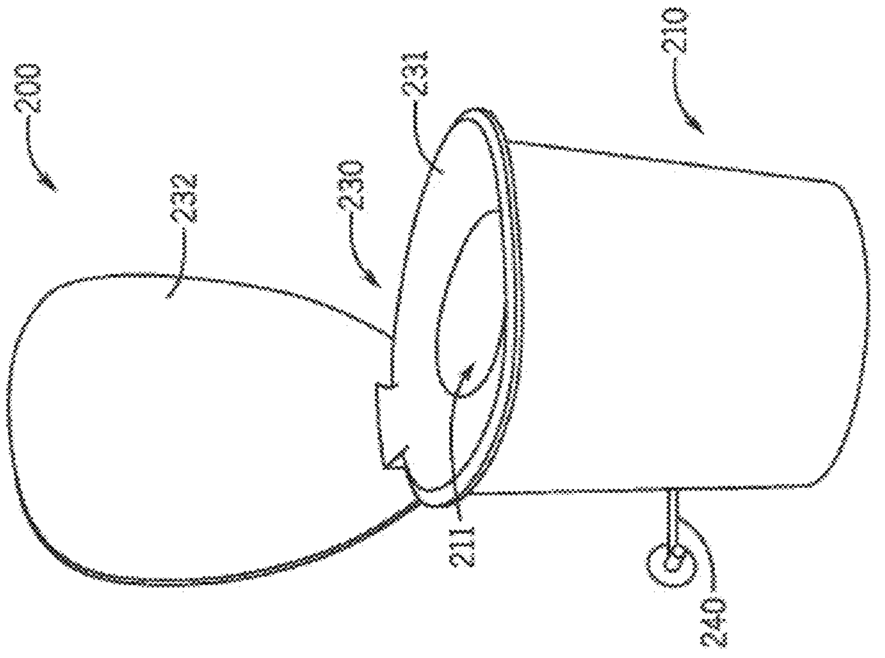
FIGS. 1 and 2 illustrate perspective views of exemplary embodiments of toilets according to the present disclosure. Specifically.
Figure 1:
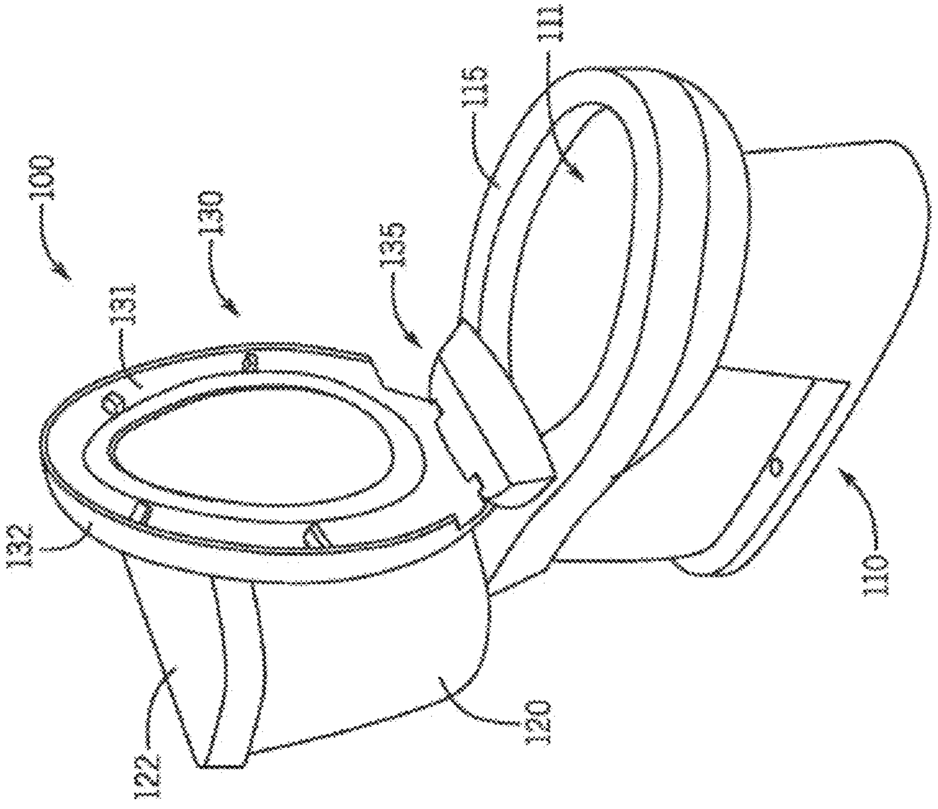

FIGS. 1 and 2 illustrates exemplary embodiments of toilets that may include an oscillating bidet according to the present disclosure. The toilets 100 and 200 of FIGS. 1 and 2 may be manufactured to include an oscillating bidet according to the present disclosure or an oscillating bidet according to the present disclosure may be manufactured separately from and attached to the toilets 100 or 200. In some examples, an oscillating bidet according to the present disclosure may be manufactured with a component or element of a toilet and that component or element of the toilet may be replaced to facilitate installation of the oscillating bidet. For example, an oscillating bidet may be manufactured with a toilet seat and a toilet seat of the toilets 100 or 200 may be replaced with the toilet seat including an oscillating bidet.

Referring to FIG. 1 a toilet 100 including a base 110 (e.g., a pedestal, bowl, etc.) and a tank 120 is shown. The base 110 is configured to be attached to another object such as a drainpipe, floor, or another suitable object. The base 110 includes a bowl 111, a sump (e.g., a receptacle) disposed below the bowl 111, and a trapway fluidly connecting the bowl 111 to a drainpipe or sewage line. The tank 120 may be supported by the base 110, such as an upper surface of a rim 115. The tank 120 may be integrally formed with the base 110 as a single unitary body. In other embodiments, the tank 120 may be formed separately from the base 110 and coupled (e.g., attached, secured, fastened, connected, etc.) to the base 110. The toilet 100 may further include a tank lid 122 covering an opening and inner cavity in the tank 120. The toilet 100 may include a seat assembly 130 including a seat 131 and a seat cover 132 rotatably coupled to the base 110. The toilet 100 may further include a hinge assembly 135.

Referring to FIG. 2, a tankless toilet 200 is shown. The toilet 200 includes a base 210 and a seat assembly 230 coupled to the base. The base 210 includes a bowl 211, a sump disposed below the bowl 211, and a trapway fluidly connecting the bowl 211 to a drainpipe or sewage line. The toilet 200 includes a waterline 240 that supplies the toilet 200 with water. The toilet 200 may further include a seat assembly 230 including a seat 231 and a seat cover 232 rotatably coupled to the base 210. The toilets 100 and 200 of FIGS. 1 and 2 are provided herein as non-limiting examples of toilets that may be configured to utilize aspects of the present disclosure.

Figure 3:
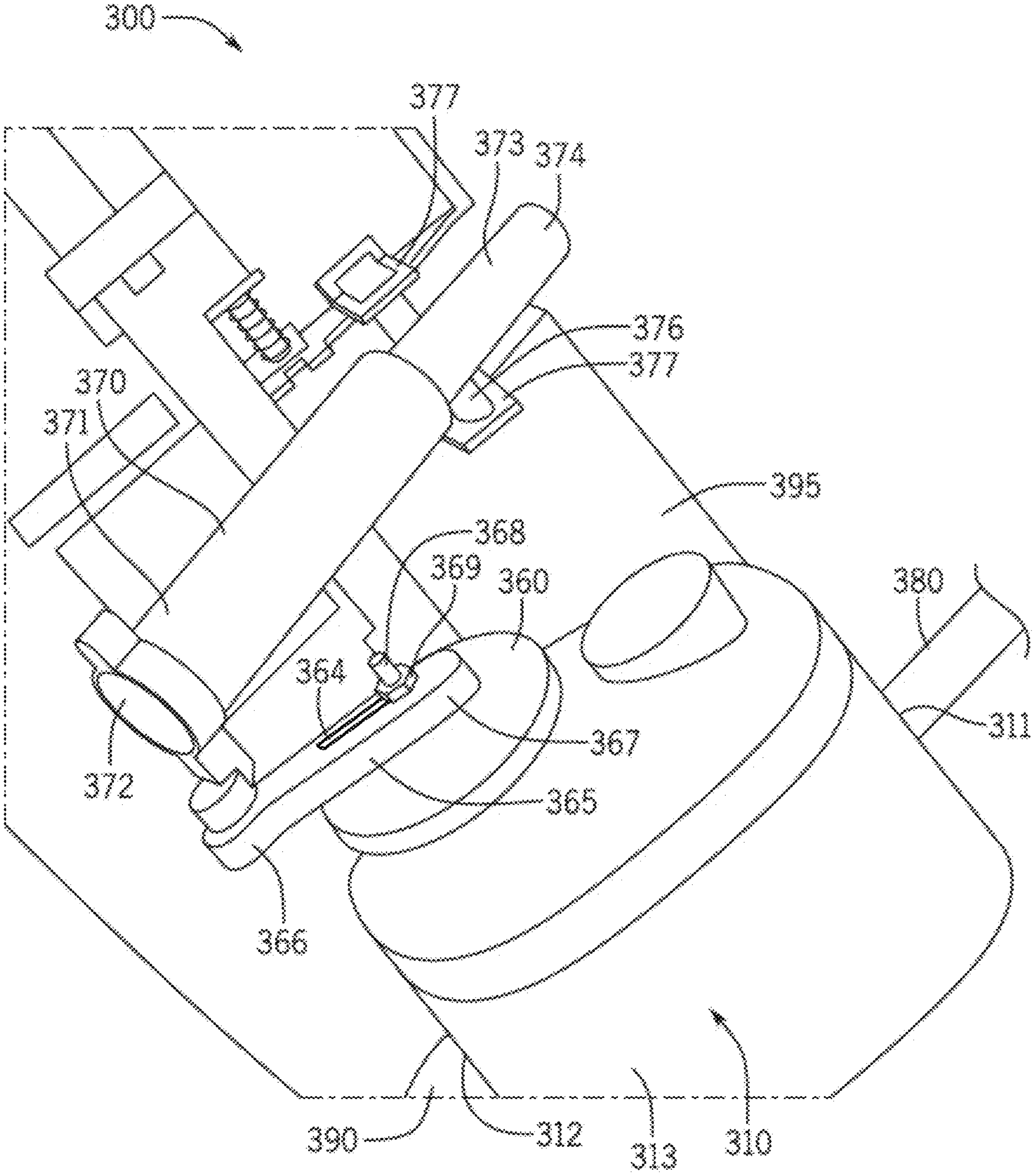
FIG. 3 illustrates a bidet according to an exemplary embodiment of the present disclosure.

FIG. 3 illustrates a bidet 300 according to an exemplary embodiment of the present disclosure. In some examples, the bidet 300 may be included in a seat or pedestal of a toilet. In other examples, the bidet 300 may be manufactured separately from and attached or coupled to a seat or pedestal of a toilet. FIG. 3 illustrates a bidet 300 manufactured separately from and configured to be attached to a seat of a toilet. The bidet 300 includes a housing 310. The housing 310 is configured to receive a flow of water through a housing inlet 311 and dispense the flow of water from a housing outlet 312. The housing inlet 311 and housing outlet 312 may be located on opposite ends of the housing 310 from one another, such that water may flow through the housing 310 from the housing inlet 311 to the housing outlet 312. In some examples, the housing 310 further includes a chamber 315 (See FIGS. 5-7). As the housing 310 receives the flow of water, the chamber 315 may fill with water and provide a flow of water between the housing inlet 311 and the housing outlet 312. The chamber 315 may be configured to contain the flow of water and direct the flow of water from the housing inlet 311 to the housing outlet 312. In some examples, after the chamber 315 has filled with water, the flow of water may travel along a substantially linear path between the housing inlet 311 and the housing outlet 312. In some examples, one or more walls 314 within the housing 310 may be included to help direct a flow of water between the housing inlet 311 and the housing outlet 312. The bidet 300 may further include a housing inlet conduit 380 configured to direct a flow of water to the housing inlet 311. The housing inlet conduit 380 may be coupled to a water supply such as tank 120 or waterline 240. The housing 310 may further include a gear assembly 320 or a portion of the gear assembly 320.

Figure 4:
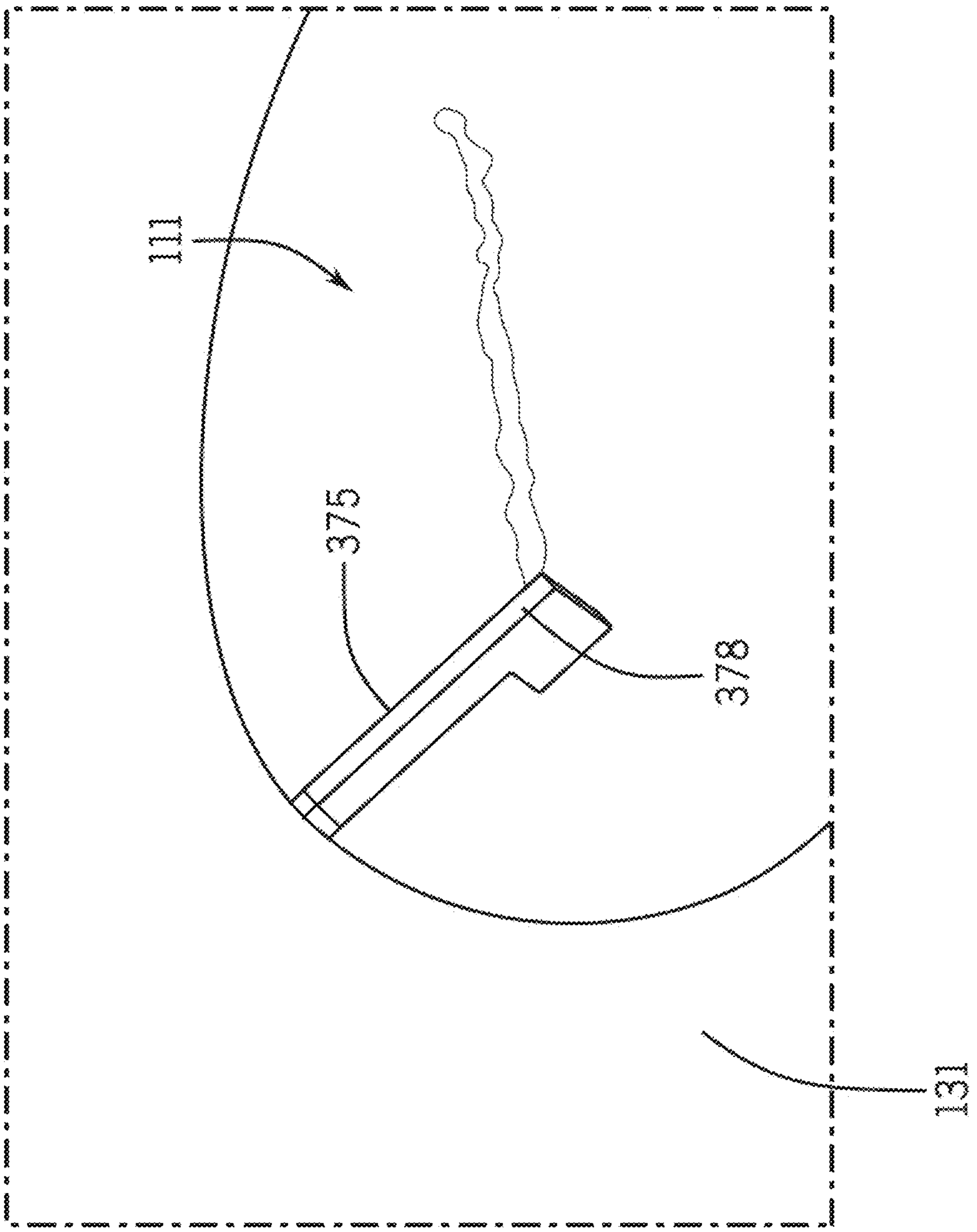
FIG. 4 illustrates a bidet wand according to an exemplary embodiment of the present disclosure.

FIG. 4 illustrates a bidet wand 375 according to an exemplary embodiment of the present disclosure. In some examples, the bidet wand 375 may be disposed within a wand housing 370, as illustrated in FIG. 3. In these examples, the bidet wand 375 may be configured to extend from the wand housing 370. Specifically, a flow of water entering the bidet wand housing 370 may contact the bidet wand 375, exerting a force on the bidet wand 375 causing the bidet wand 375 to extend from or out of the bidet wand housing 370. In some examples, a biasing member, such as, a spring, may apply a force to the bidet wand 375, keeping it in the bidet wand housing 370 when water is not flowing into the bidet wand housing 370. When extended, the bidet wand 375 may extend from below a bottom surface of a toilet seat (e.g., toilet seat 131) and into the bowl (e.g., bowl 111). The bidet wand 375 may be configured to dispense water into the bowl 111. The bidet wand 375 may be configured to dispense water upward and outward, so that the water contacts a user of the toilet and subsequently falls into the bowl 111. In some examples, a bidet wand (e.g., 375) may be directly rotatably coupled to a mounting plate 395. In yet other examples, water may be dispensed directly from the bidet wand housing 370.

Figure 5:
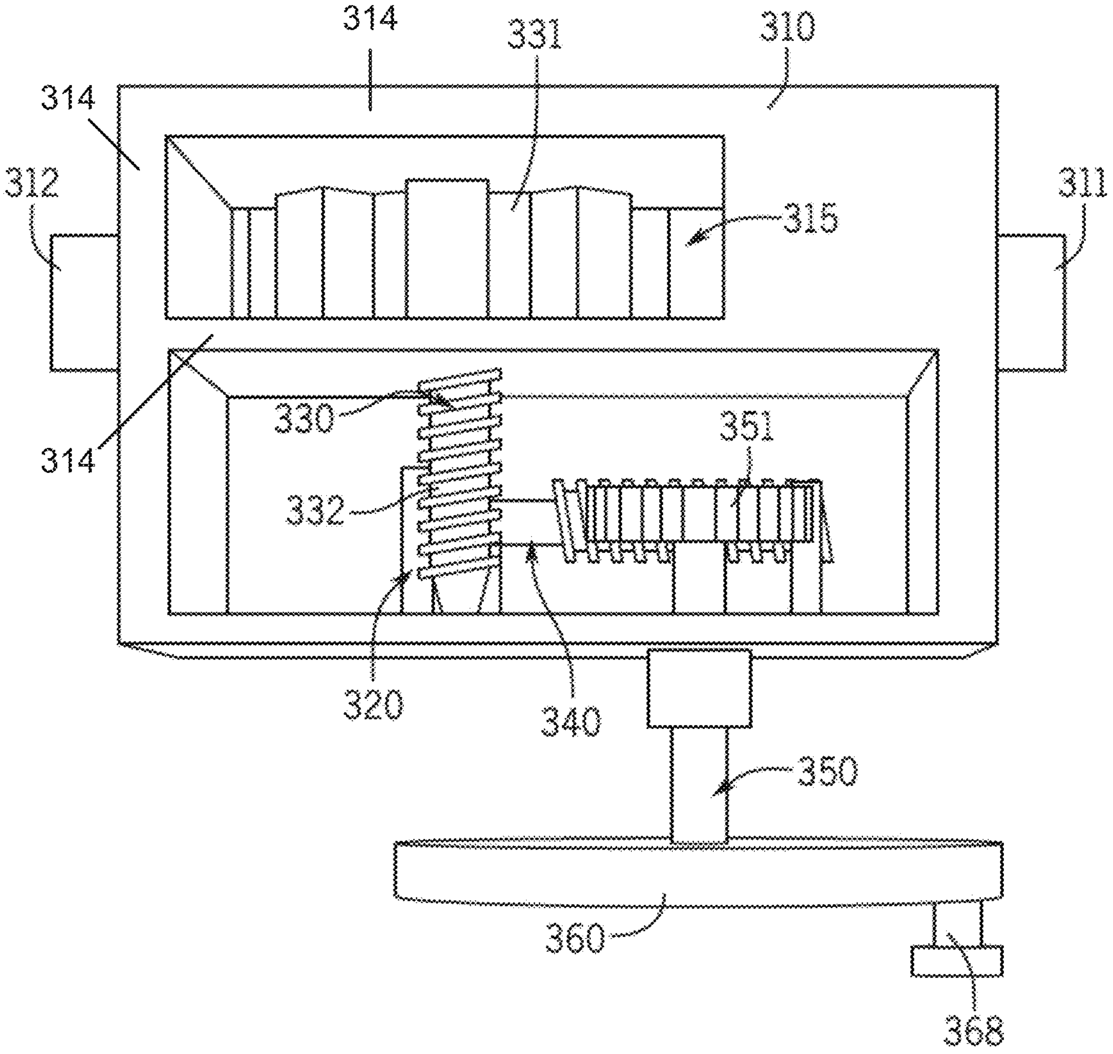
FIG. 5 illustrates a cross-sectional view of a housing according to an exemplary embodiment of the present disclosure.
Figure 6:
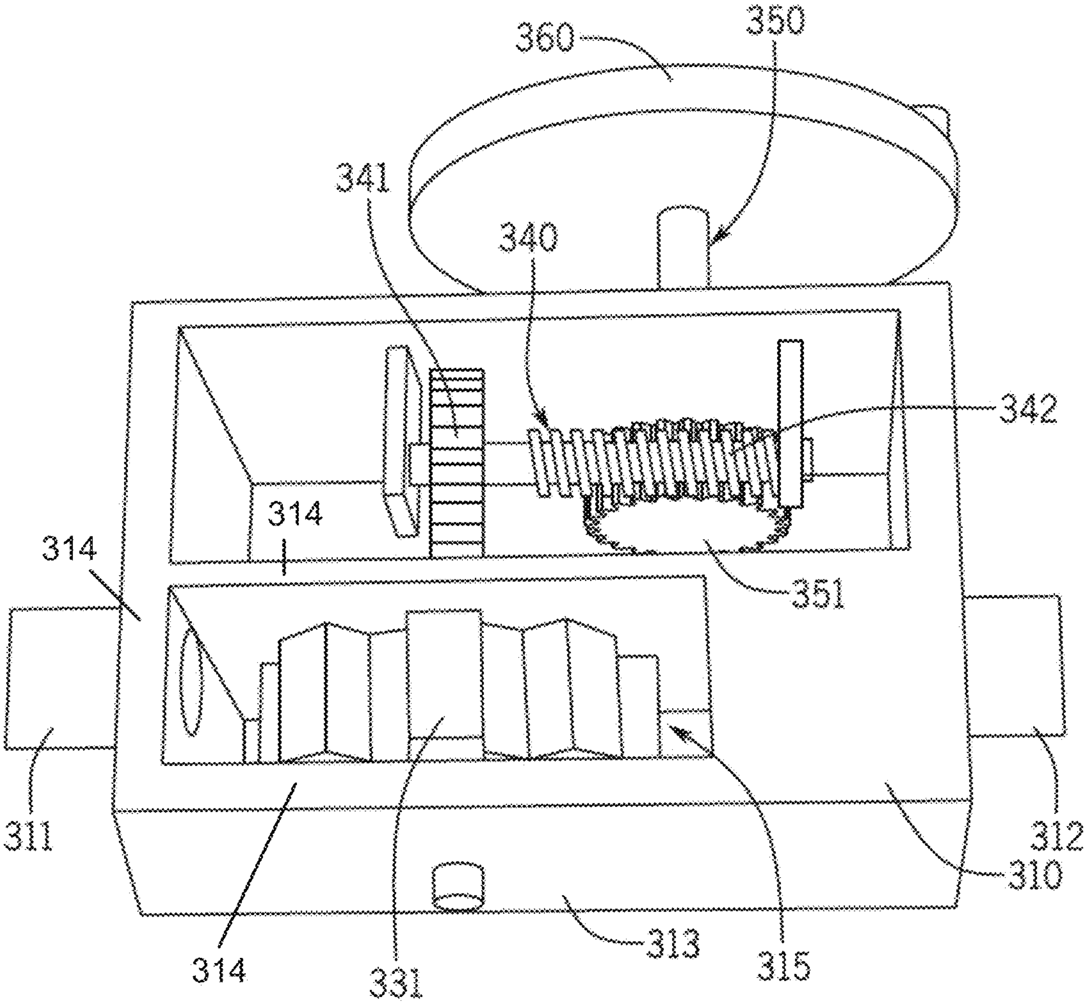
FIG. 6 illustrates a cross-sectional perspective view of the housing of FIG. 5 according to an exemplary embodiment of the present disclosure.
Figure 7:
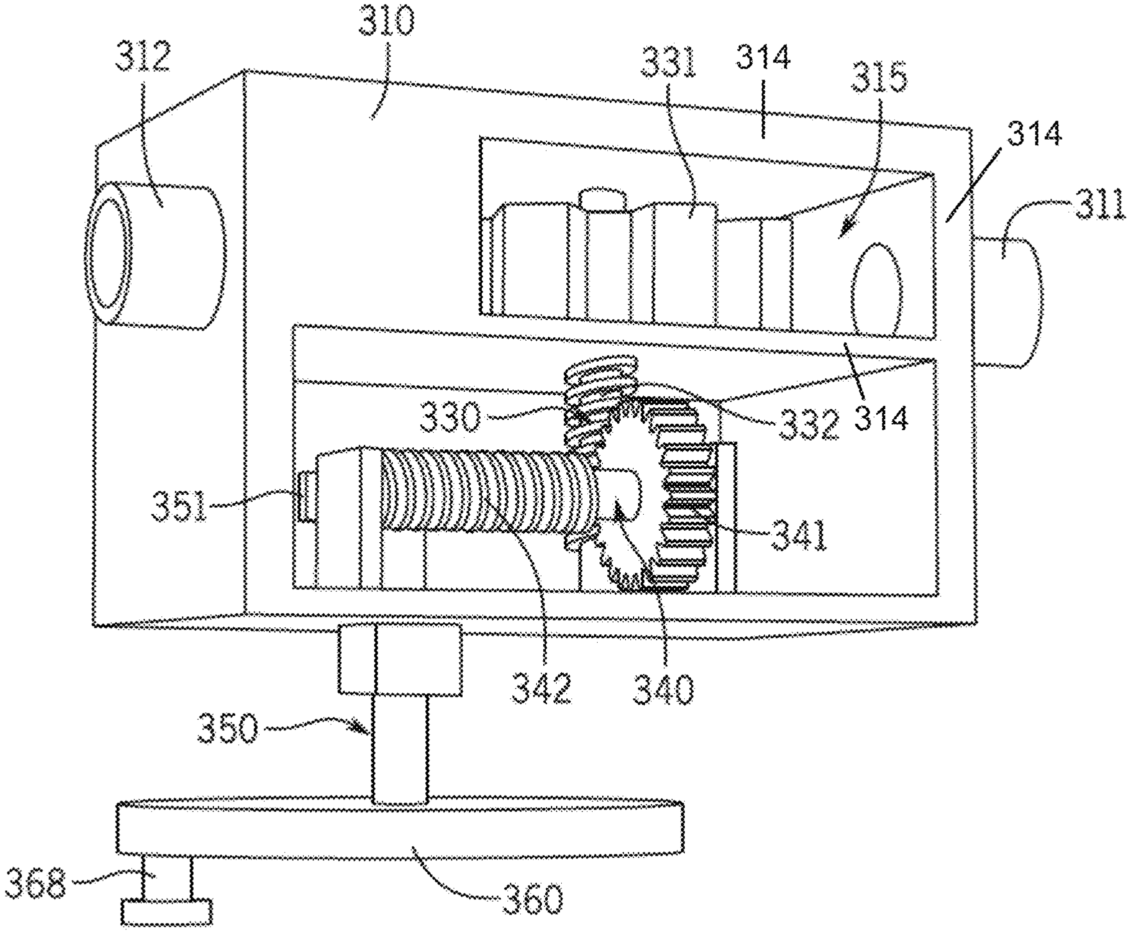
FIG. 7 is another cross-sectional perspective view of the housing of FIG. 5 according to an exemplary embodiment of the present disclosure.

FIGS. 5-7 illustrates a housing 310 and gear assembly 320 according to an exemplary embodiment of the present disclosure. FIG. 5 illustrates a cross-sectional view of a housing 310 including a gear assembly 320 according to an exemplary embodiment of the present disclosure. FIGS. 6 and 7 illustrate cross-sectional perspective views of the housing 310 of FIG. 5. Referring generally to FIGS. 5-7, the gear assembly 320 includes a first shaft or rotating element 330, a second shaft or rotating element 340, and a third shaft or rotating element 350. The first shaft 330, second shaft 340, and third shaft 350 may be comprised of various materials. For example, the first shaft 330, second shaft 340, and/or third shaft 350 may be comprised of a metal or metal alloy, a plastic, or another material. In some embodiments, the entire gear assembly (e.g., first shaft 330, second shaft 340, and third shaft 350) may be disposed within the housing 310. In other embodiments, a portion of the gear assembly and/or portions of the first shaft 330, second shaft 340 and/or third shaft 350 may be disposed outside the housing.

Referring to FIG. 5, the first shaft 330 includes an impeller or turbine 331 and a worm gear 332. In some examples, the turbine 331 and/or the worm gear 332 may be integrally formed with the first shaft 330 as a single unitary body. In other examples, the turbine 331 and/or worm gear 332 may be formed separately from the first shaft 330 and fixed to the first shaft, for example, using an adhesive or welding. The turbine 331 and the worm gear 332 may be fixed to the first shaft 330 such that the turbine 331 and worm gear 332 do not move (e.g., rotate) relative to the first shaft 330. The turbine 331 and the worm gear 332 may be located on opposite ends, respectively, of the first shaft 330. The first shaft 330 further includes a first axis of rotation about which the first shaft 330 is configured to rotate. The first axis of rotation may be perpendicular to a flow of water (e.g., a substantial portion of the flow of water) from the housing inlet 311 to the housing outlet 312 through the chamber 315. As the flow of water moves through the housing 310 from the housing inlet 311 to the housing outlet 312, the flow of water contacts the turbine 331, exerting a force on the turbine 331, causing the turbine 331 and first shaft 330 to rotate about the first axis of rotation (i.e., rotate about an axis perpendicular to the flow of water).

Referring to FIG. 6, the second shaft 340 includes a spur gear 341 and a worm gear 342. In some examples, the spur gear 341 and/or the worm gear 342 may be integrally formed with the second shaft 340 as a single unitary body. In other examples, the spur gear 341 and/or worm gear 342 may be formed separately from the second shaft 340 and fixed to the second shaft 340, for example, using an adhesive or welding. The spur gear 341 and worm gear 342 may be fixed to the second shaft 340 such that the spur gear 341 and worm gear 342 do not move (e.g., rotate) relative to the second shaft 340. The spur gear 341 and the worm gear 342 of the second shaft 340 may be located on opposite ends, respectively, of the second shaft 340. The second shaft 340 includes a second axis of rotation about which the second shaft is configured to rotate. The second axis of rotation may be perpendicular to the first axis of rotation. Additionally, the second axis of rotation may be parallel to a flow of water through the housing 310. The spur gear 341 of the second shaft 340 is positioned within the housing 310 to be interlocked with the worm gear 332 of the first shaft 330. Accordingly, as the first shaft 330 rotates, the worm gear 332 of the first shaft 330 transmits rotational force to the spur gear 341 of the of the second shaft 340, causing the second shaft 340 to rotate. The second shaft 340 may rotate in a plane parallel to a direction of a flow of water through the chamber 315 of the housing.

Referring to FIG. 5, the third shaft 350 includes a spur gear 351 and is attached to the cam 360. In some examples, the spur gear 351 and/or the cam 360 may be integrally formed with the third shaft 350 as a single unitary body. In other examples, the spur gear 351 and/or the cam 360 may be formed separately from the third shaft 350 and attached to the third shaft 350, for example, using an adhesive or welding. The spur gear 351 and the cam 360 may be fixed to the third shaft 350 such that the spur gear 351 and the cam 360 do not move (e.g., rotate) relative to the third shaft 350. The cam 360 may be attached to an end of the third shaft 350 opposite the spur gear 351. The cam is attached to the third shaft 350 so as to rotate with the third shaft 350. The cam 360 may be attached to the third rotating element 30 using an adhesive or one or more fasteners. The third shaft 350 includes a third axis of rotation about which the third shaft 350 rotates. The third axis of rotation may be perpendicular to a flow of water through the chamber 315 of the housing 310. The spur gear 351 of the third shaft 350 is positioned within the housing 310 so as to be interlocked with the worm gear 332 of the second shaft 340. Accordingly, as the second shaft 340 rotates, the worm gear 342 of the second shaft 340 transmits a rotational force to the spur gear 351 of the third shaft 350, causing the third shaft 350 to rotate.

Accordingly, as a flow of water passes through the housing (e.g., the chamber 315 of the housing), the flow of water contacts turbine 331 causing the turbine 331 and first shaft 330 to rotate about an axis (e.g., the first axis of rotation) perpendicular to the flow of water through the chamber 315. The worm gear 332 of the first shaft 330 may engage the spur gear 341 of the second shaft causing the second shaft 340 to rotate about an axis (e.g., the second axis of rotation) parallel to the flow of water through the chamber 315 as the first shaft 330 rotates. The worm gear 342 of the second shaft 340 may engage the spur gear 351 of the third shaft 350 causing the third shaft 350 to rotate about an axis (e.g., the third axis of rotation) perpendicular to the flow of water through the chamber 315 as the second shaft 340 rotates. The gear assembly 320 is configured to transmit energy (e.g., kinetic energy) from the flow of water to the cam 360 causing the cam 360 to rotate. In some examples, the first axis of rotation (of the first shaft 330) and the third axis of rotation (of the third shaft 350) may be parallel to one another. In some examples, the first axis of rotation and the third axis of rotation may be perpendicular to the second axis of rotation (of the second shaft 340).

In some examples, instead of the worm gears (332, 342) and the spur gears (341, 351) described above, one or more belts (e.g., drive belts) may extend between any two or more of the first shaft 330, the second shaft 340, and/or the third shaft 350. Each of the one or more belts may be configured to transfer or transmit rotational energy between any two or more of the first shaft 330, the second shaft 340, and/or the third shaft 350. In other examples, the gear assembly 320 may further include one or more crankshafts and/or rods configured to transmit motion and/or kinetic energy from the turbine 331 to the cam 360. In some examples, a single rod or shaft may extend between the turbine 331 and the cam 360.

The housing 310 may be comprised of a metal or metal alloy, a plastic, or another material. The housing 310 includes an exterior surface 313. The housing 310 may further including one or more walls 314 within the housing 310 (e.g., within the chamber 315 of the housing 310) defining a pathway between the housing inlet 311 and the housing outlet 312. Additionally, one or more walls 314 within the housing 310 may be configured to contact the first shaft 330, second shaft 340, and the third shaft 350, positioning the first shaft 330, second shaft 340, and/or third shaft 350 within the housing 310. The one or more walls 314 may hold the first shaft 330, second shaft 340 and/or third shaft in position, while allowing the first shaft 330, second shaft 340, and third shaft 350 to rotate.

Returning to FIG. 3, the bidet 300 further includes a mounting plate 395. The mounting plate 395 may be coupled or attached to a toilet seat. For example, the mounting plate 395 may be attached or coupled to a bottom of the toilet seat. The mounting plate 395 may be attached or coupled to a bottom surface of the toilet seat using an adhesive, one or more fasteners, or the like. The housing 310 may be coupled or attached to the mounting plate 395. For example, the housing 310 may be coupled or attached to the mounting plate 395 using an adhesive or one or more fasteners.

The bidet 300 further includes a wand housing 370. The wand housing 370 includes a wand housing inlet 372 or wand housing water inlet disposed at a wand housing first end 371 and a wand housing outlet 374 or wand housing water outlet disposed at a wand housing second end 373. The wand housing 370 is configured to direct a flow of water from the wand housing inlet 372 to the wand housing outlet 374. In some examples, the wand housing outlet is 374 is configured to supply the flow of water to the bidet wand 375 (see FIG. 4). The bidet wand 375 may be configured to extend from the wand housing 370. For example, the pressure or the flow of water into the wand housing 370 through the wand housing inlet 372 May cause the bidet wand 375 to extend from the wand housing 370. The bidet wand 375 may be disposed in the wand housing 370 when the bidet wand 375 is in a retracted position, for example, when no water is flowing into the wand housing. A biasing member, such as a spring, may be used to maintain a retracted position of the bidet wand 375 when the flow of water is not flowing into the wand housing 370. In other examples, water may be dispensed directly from the wand housing outlet 374 (e.g., onto a user).

The wand housing 370 is rotatably coupled to the mounting plate 395. In some examples, a pivot rod 376 and two pivot rod supports 377 may rotatably couple the bidet wand housing 370 to the mounting plate 395. The pivot rod supports 377 may be integrally formed with the mounting plate 395 as a single unitary body. The pivot rod 376 may be fixed to the bidet wand housing 370, while being free to rotate with respect to the two pivot rod supports 377. In some examples, the pivot rod 376 may be fixed to the bidet wand housing 370 so as to be closer to the wand housing second end 373 than the wand housing first end 371. The wand housing 370 is configured to oscillate as a flow of water enters the wand housing 370. Accordingly, the flow of water extends the bidet wand 375 and causes the bidet wand 375 to oscillate with the wand housing 370. The bidet wand 375 may be configured to oscillate between more than one use position. The bidet wand 375 may include a bidet wand outlet 378 (see FIG. 4) configured to dispense the flow of water as the bidet wand 375 oscillates. The bidet wand 375, specifically, the wand outlet 378 is configured to dispense a flow of water towards a user, when a user is using a toilet (e.g., when a user is sitting on a toilet seat). The flow of water dispensed from the wand outlet may contact a user and fall into a bowl of the toilet.

The bidet 300 further includes a cam arm 365. The cam arm 365 includes a cam arm first end 366 and a cam arm second end 367. The cam arm first end 366 is rotatably coupled to the bidet wand housing 370. The cam arm first end 366 and the bidet wand housing may be rotatably coupled at a single point, such that the cam arm 365 and the bidet wand housing 370 rotate relative to one another about a single axis. A rod, pin, rivet, nail, screw, bolt, or the like may be used to rotatably couple the cam arm 365 to the bidet wand. The cam arm 365 may be coupled to the bidet wand housing 370 at or near the wand housing first end 371. The cam arm second end 367 is rotatably coupled to the cam 360. In some examples, the cam arm second end 367 and the cam 360 may be coupled at a single point (e.g., so as to rotated relative to one another about a single axis). In other examples, as illustrated in FIG. 3, the cam arm 365 may include a slot 364 at or near the cam arm second end 367. A fastener 368, such as a bolt, rod, pin, rivet, nail, screw, or the like, and a nut may be used to rotatably couple the cam arm 365 to the cam 360. The fastener 368 may extend from the cam 360 through the slot 364 and the nut 369 may be screwed or threaded on to the fastener 368, locking the cam arm 365 between the cam 360 and the nut 369. As the cam 360 rotates, the fastener 368 may move within the slot 364.

As the cam 360 rotates, the fastener 368 rotates around the cam axis of rotation. As the fastener 368 rotates, the fastener 368 causes the cam arm 365 to move with the fastener 368. The fastener 368 may push and/or pull the cam arm 365 as the fastener 368 rotates about the cam axis of rotation. The fastener 368 may move within the slot 364 as the cam 360 rotates. As the cam arm 365 moves, the cam arm 365 may push and/or pull the bidet wand housing 370 causing the bidet wand housing 370 and bidet wand 375 to oscillate through more than one use position. In some examples, as illustrated in FIG. 3, the bidet wand housing 370 oscillates upward and downward (i.e., in a vertical plane). In other examples, the bidet wand housing 370 may be positioned to oscillate from side to side (i.e., in a horizontal plane). Each rotation of the fastener 368 about the cam axis of rotation may coincide with one oscillation of the bidet wand housing 370. The length of time required for the fastener 368 to make one rotation about the cam axis of rotation and the length of time required for the bidet wand housing 370 to make one oscillation may be referred to as the period of oscillation.

The period or duration of an oscillation and the range of oscillation of the bidet wand housing 370 and thus the bidet wand 375 may vary. The speed of water flowing through the housing 310 may be inversely proportional to the period of oscillation. For example, as the speed of the flow of water flowing through the housing 310 increases the period of oscillation may decrease. Further, as the speed of the flow of water flowing through the housing decreases, the period of oscillation increases. Additionally, the size (e.g., diameter) and/or orientation of turbine 331, worm gear 332, spur gear 341, worm gear 342, and spur gear 351 may vary, varying the period or oscillation. In some examples, one or more gears may be added to or removed from the gear assembly 320 in order to change the period of oscillation of the bidet. For example, one or more gears may be added or removed from the gear assembly to reduce and/or increase the period of oscillation of the bidet. In some examples, as the period of oscillation increases, the speed at which the bidet wand 375 moves (e.g., between the first position illustrated in FIG. 8 and the second position illustrated in FIG. 9) may decrease. Further, in some examples, as the period of oscillation decreases, the speed at which the bidet wand moves may increase. The range of oscillation of the bidet wand 375 may be controlled by the length of the cam arm 365. For example, increasing the length of the cam arm 365 may increase the range of oscillation. Further decreasing the length of the cam arm 365. May decrease the range of oscillation of the bidet wand 375. Additionally, changing the location at which the pivot rod 376 is fixed to the bidet wand housing 370 may change the range of oscillation of the bidet wand 375.

Figure 8:
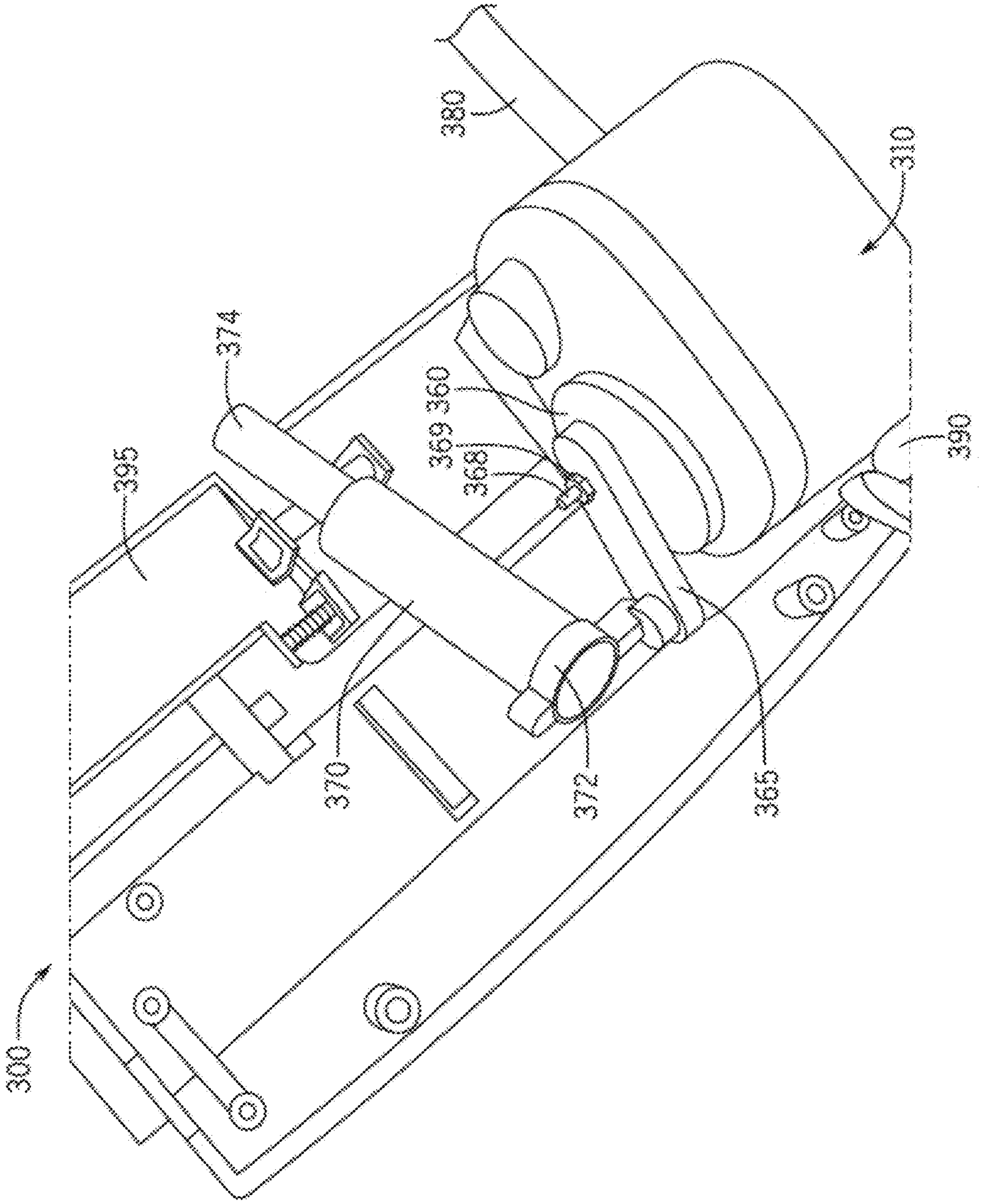
FIG. 8 illustrates a bidet wand housing in a first position according to an exemplary embodiment of the present disclosure.

FIG. 8 illustrates a bidet wand housing 370 in a first position (e.g., a first use position) according to an exemplary embodiment of the present disclosure. As illustrated in FIG. 8, the bidet wand housing 370 is positioned such that if the bidet 300 were mounted to the underside of a toilet seat, the bidet wand housing 370 and bidet wand 375 would be positioned such that the bidet wand 375 dispenses a flow of water upward and outward from the wand outlet 378. The first position of the bidet wand housing 370 may be a position in which the angle of the bidet wand housing 370 has a largest vertical component. In other words, the first position may be a position of the bidet wand housing 370 in which the bidet wand housing 370 and thus the bidet wand 375 are angled the furthest upward.

Figure 9:
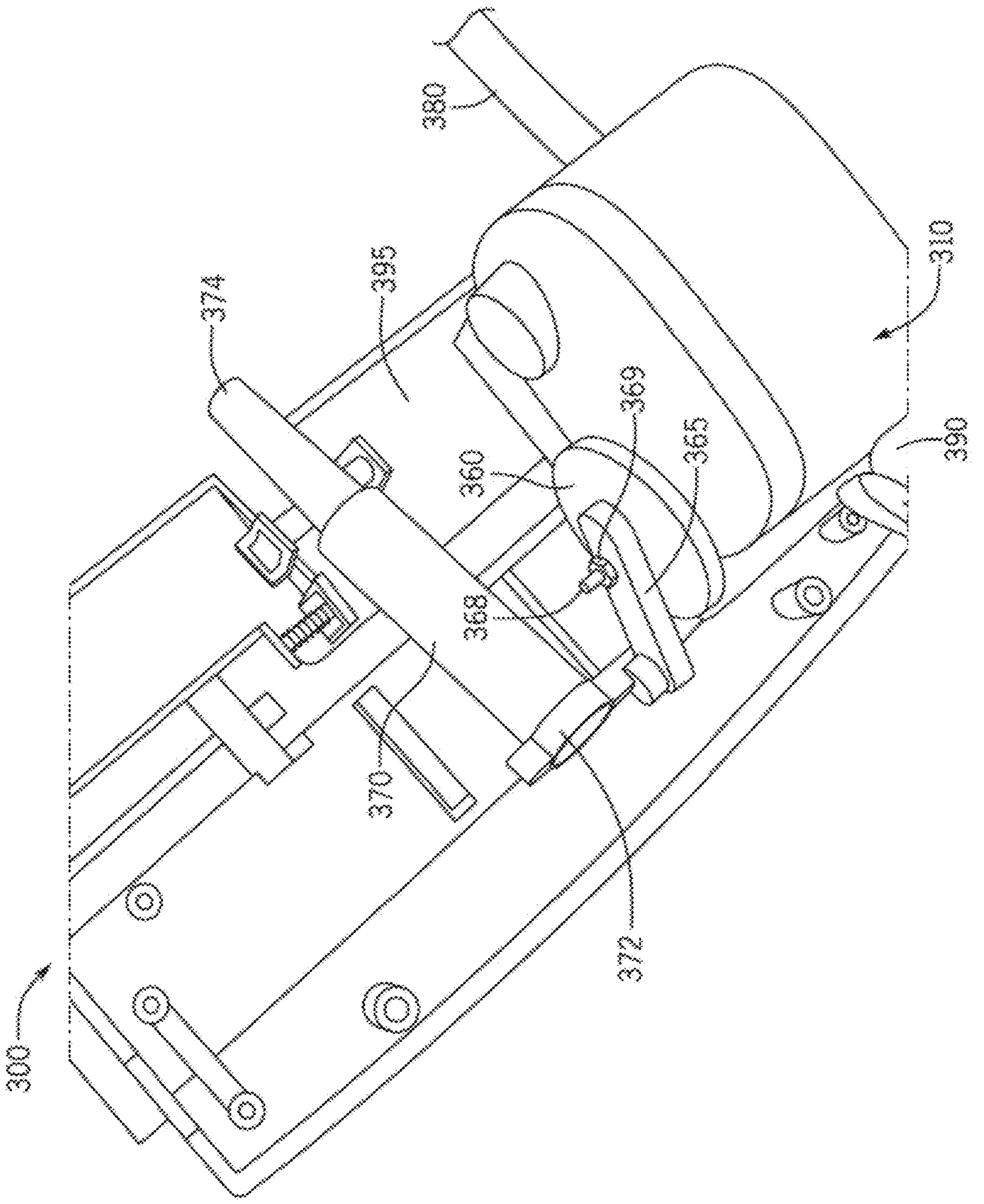
FIG. 9 illustrates a bidet wand housing in a second position according to an exemplary embodiment of the present disclosure.

FIG. 9 illustrates a bidet wand housing 370 in a second position (e.g., a second use position) according to an exemplary embodiment of the present disclosure. As illustrated in FIG. 9, the bidet wand housing 370 is positioned such that if the bidet 300 were mounted to the underside of a toilet seat, the bidet wand 375 would dispense a flow of water upward and outward from the wand outlet 378. The second position of the bidet wand 375 may be a position in which the angle of the bidet wand housing 370 and thus the bidet wand 375 have the smallest vertical component. In other words, the second position may be a position of the bidet wand housing 370 in which the bidet wand is angled closest to horizontal. The bidet wand housing 370 may be configured to oscillate between the first position and the second position. The wand housing outlet 374 may be configured to dispense water as the bidet wand housing 370 oscillates between the first position and the second position.

Figure 10:
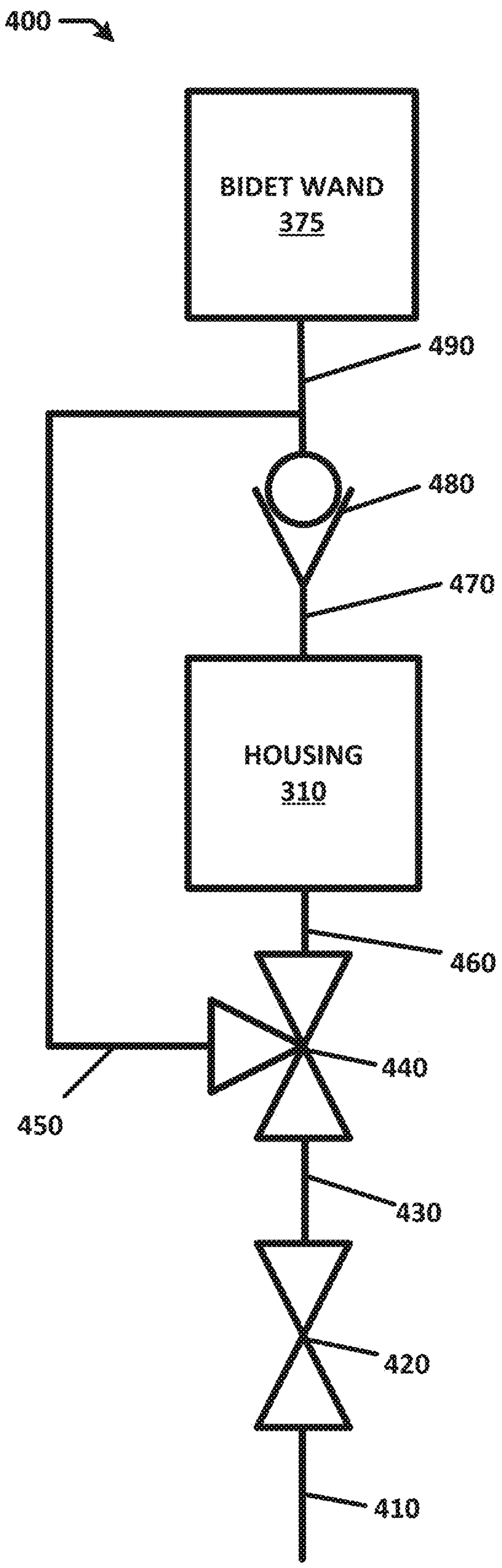
FIG. 10 illustrates an oscillating bidet assembly according to an exemplary embodiment of the present disclosure.

FIG. 10 illustrates a bidet assembly 400 according to an exemplary embodiment of the present disclosure. The bidet assembly includes a housing 310 and a bidet wand 375. The housing 310 and the bidet wand 375 may be the same as those discussed above with respect to FIGS. 4-7. The bidet assembly further includes a supply conduit 410, a first valve 420, a first conduit 430, a second valve 440, a bypass conduit 450, a second conduit 460, a third conduit 470, a check valve 480, and a fourth conduit 490. Each of the supply conduit 410, first conduit 430, bypass conduit 450, second conduit 460, third conduit 470, and fourth conduit 490 may be a pipe, tube, or other channel for directing and/or conveying a flow of water. Each of the supply conduit 410, first conduit 430, bypass conduit 450, second conduit 460, third conduit 470, and fourth conduit 490 may be comprised of plastic, metal, of another material and may be flexible or rigid.

The supply conduit 410 is connected (e.g., in fluid communication with) the first valve 420. The supply conduit 410 may be configured to direct or supply a flow of water to the first valve 420. One end of the supply conduit 410 may be connected the first valve 420 and the other end of the supply conduit 410 may be connected to a water supply. The water supply may be for example, a reservoir in disposed in a tank (e.g., tank 120) of the toilet or a building water line (e.g., waterline 240).

The first valve 420 may be a two way valve. For example, the first valve 420 may be a pressure gate or a ball valve. The first valve 420 may be configured to control the flow of water from the supply conduit 410 to the first conduit 430. The first valve 420 may be configured to allow the entire flow of water from the supply conduit 410 to flow to the first conduit 430, this may correspond to an on position in which water flows to the bidet wand 375. Further, the first valve 420 may be configured to prevent the entire flow of water from flowing from the supply conduit 410 to the first conduit 430, this may correspond to an off position in which water does not flow to the bidet wand 375. Additionally, the first valve 420 may be configured to control a portion of the flow of water that passes through the first valve 420. The first valve 420 may control a speed and/or a flow rate of water that passes through the first valve 420.

The first conduit 430 is connected to the first valve 420 and the second valve 440. The first conduit is configured to direct or supply a flow of water from the first valve 420 to the second valve 440.

The second valve 440 is connected to the first conduit 430, the bypass conduit 450, and the second conduit 460. The second valve 440 is configured to receive a flow of water from the first conduit 430. The second valve 440 may be a three way valve, such as a three way ball valve. The second valve 440 may be operable to divert the flow of water between the bypass conduit 450 and the second conduit 460. The second valve 440 may be operable to divert a portion of the flow of water to the bypass conduit 450 and a portion of the supply of water to the second conduit 460. Further, the second valve 440 may be operable to divert the entire flow of water to the bypass conduit 450 or the entire flow of water to the second conduit 460. The second valve 440 may be operable to control a portion of the flow of water diverted to the bypass conduit 450 and a portion of the flow of water diverted to the second conduit 460.

The bypass conduit 450 is connected to (e.g., in fluid communication with) the second valve 440 and the fourth conduit 490. The bypass conduit 450 is configured to direct or supply the flow of water and/or a portion of the flow of water from the second valve 440 to the fourth conduit 490. The bypass conduit 450 connects the second valve 440 to the fourth conduit 490 such that the flow of water and/or a portion of the flow of water may be diverted around the housing 310 so as to not flow through the housing 310.

The second conduit 460 is connected to (e.g., in fluid communication with) the second valve 440 and the housing 310. Specifically, the second conduit 460 is connected to the housing inlet 311. The second conduit 460 is configured to direct or supply a flow of water or a portion of a flow of water from the second valve 440 to the housing 310.

The third conduit 470 is connected to the housing 310 and the check valve 480. Specifically, the third conduit 470 is connected to the housing outlet 312. The third conduit 470 is configured to direct or supply a flow of water or a portion of a flow of water from the housing 310 to the check valve 480.

The check valve 480 is configured to receive a flow of water or a portion of a flow of water from the third conduit 470 and direct or supply the flow of water or a portion of the flow of water to the fourth conduit 490. The check valve 480 may be a back flow prevention device configured to allow water to flow through the check valve 480 from the third conduit 470 to the fourth conduit 490, while preventing water from flowing through the check valve 480 from the fourth conduit 490 to the third conduit 470.

The fourth conduit 490 is connected to the check valve 480, the bypass conduit 450, and the bidet wand 375. The fourth conduit is configured to receive a flow of water or a portion of a flow of water from the check valve 480 and/or the bypass conduit 450. The fourth conduit 490 is configured to direct the flow or the portion of the flow of water to the bidet wand 375.

In some examples, the first valve 420 may be operable to control an on/off state of the bidet. For example, when the first valve 420 is open (i.e., in a position allowing water to flow from the supply conduit 410 to the first conduit 430) water may flow to the bidet wand 375 and bidet may be in an on state. Further, when the first valve 420 is closed (i.e., in a position preventing a flow of water from the supply conduit 410 to the first conduit 430) water may not flow to the bidet wand and the bidet may be in an off state. The first valve 420 may be configured to control a pressure, speed, and/or flow rate of the flow of water or the portion of the flow of water that passes through the first valve 420. When the pressure, speed, and/or flow rate of water passing through the housing 310 increases, the period of oscillation of the bidet wand may decrease. Further, as the period of oscillation decreases, the speed at which the bidet wand 375 oscillates may increase. Conversely, when the speed and/or flow rate of water passing through the housing decreases, the period of oscillation of the bidet wand 375 may increase. Further, as the period of oscillation increases, the speed at which the bidet wand 375 oscillates may decrease. Accordingly, the second valve 420 can control an oscillation speed of the bidet wand by controlling a speed or volumetric flow rate of water provided to the housing 310.

In some examples, the second valve 440 may be configured to control oscillation of the bidet wand housing 370 and the bidet wand 375. The second valve 440 may be configured to control a flow rate and/or a speed of a portion water received through the first conduit 430 that is diverted to second conduit 460 and subsequently passes through the housing 310. In some examples, a controller may be configured to determine a speed of water flowing through the chamber 315 of the housing using the volumetric flow rate of the flow of water or portion of the flow of water provided to the housing 310.

The portion of the flow of water received from the first conduit 430 that is not diverted to the second conduit 460 may be diverted to the bypass conduit 450. The second valve 440 may be operable to divert the entire flow of water to the second conduit 460, such that the entire flow of water received from the first conduit 430 passes through the housing 310. Additionally, the second valve 420 may be operable to divert the entire flow of water received from the first conduit 430 to the bypass conduit 450. When the entire flow of water is diverted to the bypass conduit 450, the bidet wand 375 may not oscillate (i.e., the bidet wand may remain in one or the same position). Accordingly, in some examples, when an oscillating bidet wand 375 reaches a desired position, a user may actuate the second valve 440 causing the entire flow of water to be diverted by the second valve 440 to the bypass conduit 460. When the entire flow of water is diverted to the bypass conduit 450 the bidet wand 375 may stop oscillating and may remain (e.g., stationary) at the desired position. Further, when the second valve 440 is actuated again, diverting a portion of the flow of water to the housing 310, the bidet wand 375 may begin oscillating.

Figure 11:
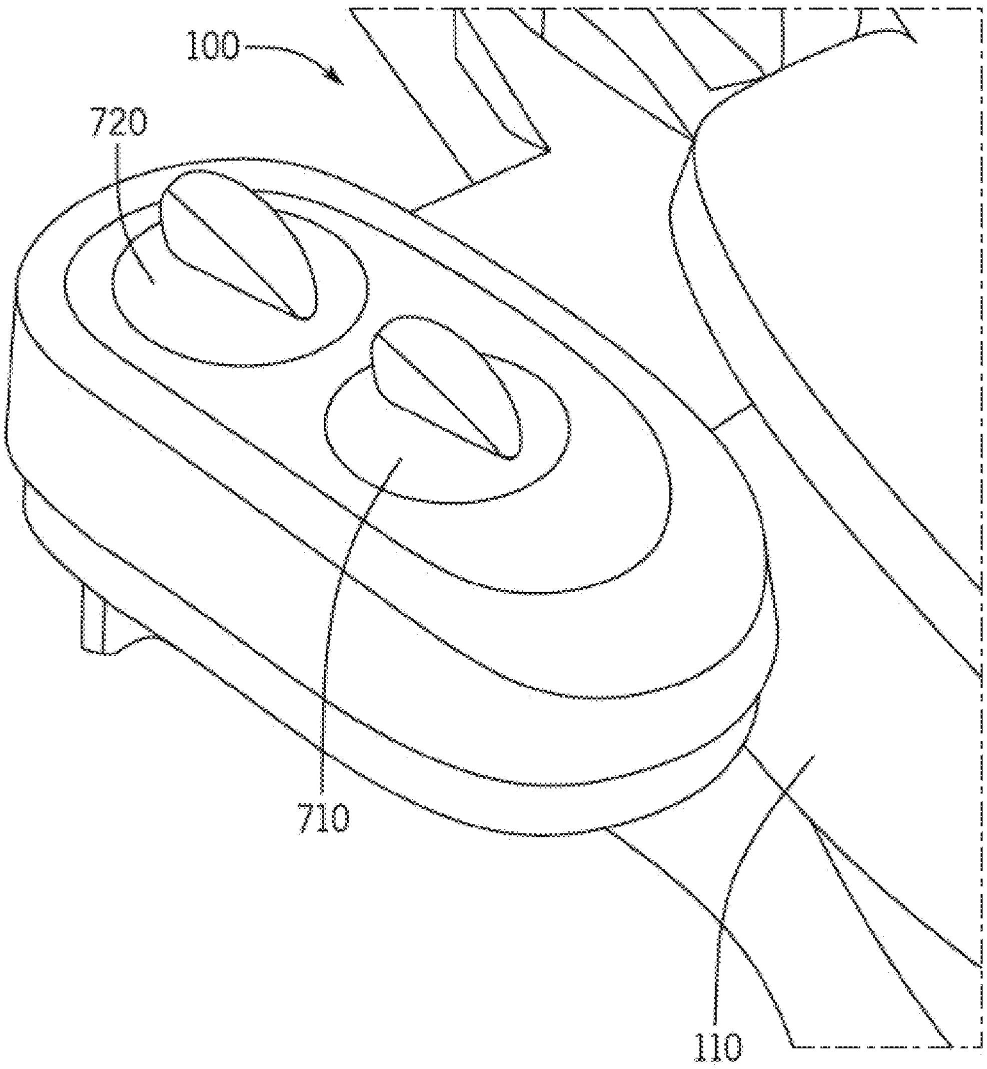
FIG. 11 illustrates a first actuator and a second actuator according to an exemplary embodiment of the present disclosure.

FIG. 11 illustrates a first actuator 710 and a second actuator 720 according to an exemplary embodiment of the present disclosure. In some examples, the first valve 420 may be connected to a first actuator 710 configured to control or change a position or orientation of the first valve 420. The first actuator 710 may control an on/off state and/or a period of oscillation of the bidet wand 375 by controlling a position or orientation of the first valve 420. The first actuator 710 may control a position of the first valve 420, so as to control whether water flows through the first valve 420 into the first conduit. The first actuator 710 may be used to turn on the bidet by changing the position or orientation of the first valve to a position or orientation in which water flows through the first valve 420 into the first conduit 430. Alternatively, the first actuator 710 may be used to turn off the bidet by changing a position or orientation of the first valve 420 to a position or orientation of the first valve in which water does not flow from the through the first valve 420 to the first conduit 430. Further, the first actuator 710 may increase or decrease the pressure, speed, and/or flow rate of the water passing through the first valve 420 and thus decrease or increase, respectively, the period of oscillation of the bidet wand 375.

In some examples, the second valve 440 may be connected to a second actuator 720. The second actuator 720 may be configured to control or change a position or orientation of the second valve 440. Changing a position or orientation of the second valve 440 may control a quantity of the flow of water diverted to the bypass conduit 450 and the second conduit 460 (and subsequently the housing 310). The second actuator 720 may control the quantity and/or magnitude of the portion of the flow of water that is diverted to the bypass conduit 450 and the quantity and/or magnitude of the portion of the flow of water that is diverted to the second conduit 460. The second actuator 720 may be operable to change the position of the second valve 440 such that the entire flow of water is diverted to the bypass conduit 450 causing the bidet wand 375 to stop oscillating and remain in the same position.

The first actuator 710 and second actuator 720 may be manual or automatic actuators. As illustrated in FIG. 10, the first actuator 710 and the second actuator 720 are manual actuators. The manual actuators may include a handle, knob, or dial located proximate to the toilet (e.g., toilet 100). In some examples, as illustrated in FIG. 10, the first actuator 710 and the second actuator 720 may be disposed next to the base 110 of the toilet 100. In another examples, the first actuator 710 and second actuator 720 may be located on or near the tank 120.

The first actuator 710 and second actuator 720 may be located such that a user is able to reach and operate the actuator when sitting on the toilet (e.g., toilet 100, 200). A user may rotate the first actuator 710 and/or the second actuator 720 changing a position of the first valve 420 and/or second valve 440, respectively. One or more mechanical elements (e.g., gears, shafts, etc.) may be disposed between the first actuator 710 and the first valve 420 and the second actuator 720 and the second valve 440 and may be configured to transmit kinetic energy from the first actuator 710 and/or second actuator 720 to the first valve 420 and/or second valve 440, respectively.

In some examples, the first actuator 710 and/or second actuator 720 may be an automatic actuator. An automatic actuator may include, for example, an electrically or a pneumatically actuated valve. An electrically operated valve may include, for example, a solenoid valve. An automatic actuator may be connected to a controller or processor configured to control a position of the valve. The automatic valve may be actuated upon receiving a control signal from the controller. The controller may send a control signal in response to a user input. The user input may be from a button, proximity sensor (e.g., optical sensor, capacitive sensor, or the like.

Figure 12:
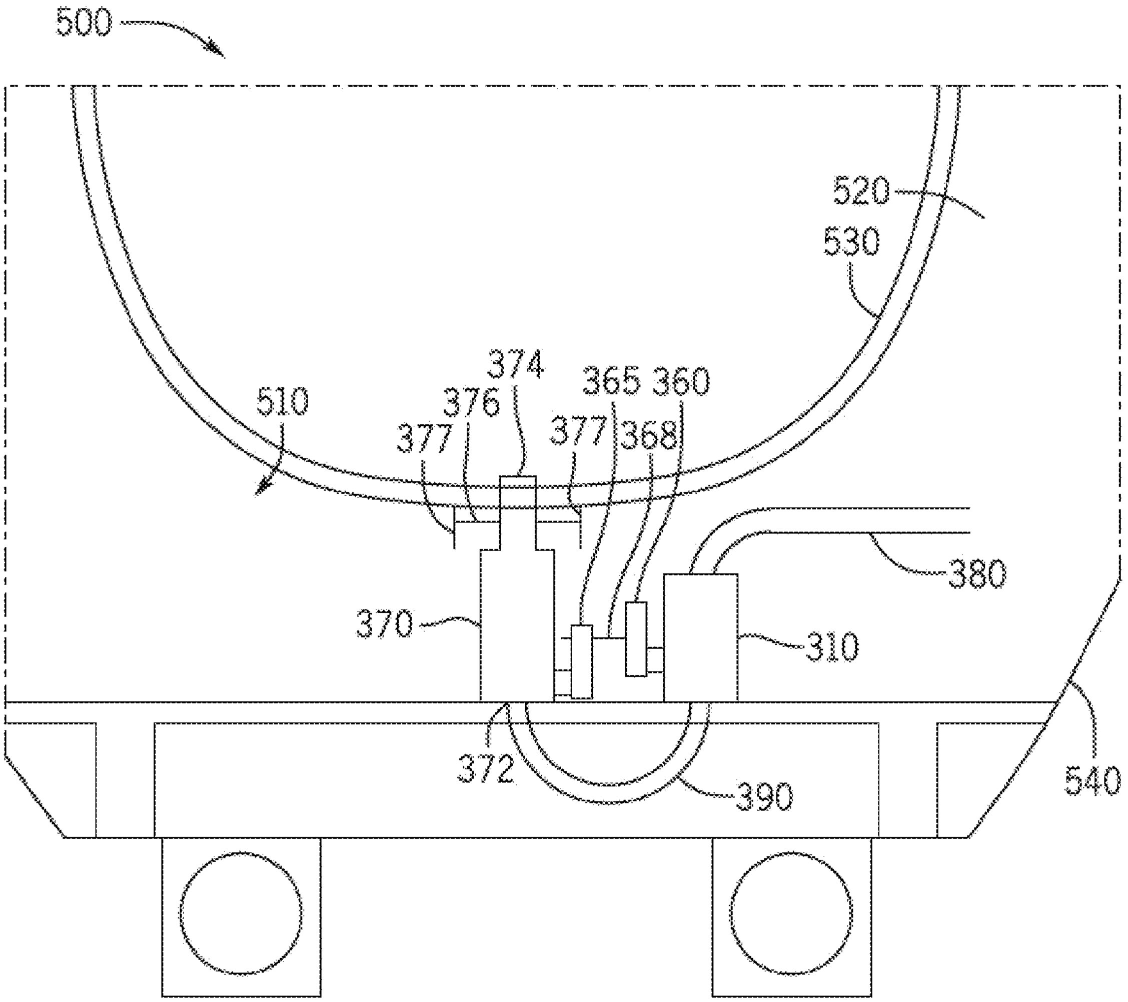
FIG. 12 illustrates a toilet seat including an oscillating bidet according to an exemplary embodiment of the present disclosure.

FIG. 12 illustrates a toilet seat 500 including an oscillating bidet according to an exemplary embodiment of the present disclosure. The toilet seat 500 may be included in the seat assemblies 130 and 230 described above with respect to FIGS. 1 and 2. The toilet seat 500 includes an oblong ring 510 having a top surface configured to support a user, a bottom surface 520, an inner edge 530 where the top surface and the bottom surface 520 meet, and an outer edge 540 where the top surface and the bottom surface 520 meet. The toilet seat 500 further includes a housing inlet conduit 380 configured to direct or supply a flow of water to a housing 310. The housing inlet conduit 380 may be the same as described above with respect to FIG. The housing 310 may be the same as described above with respect to FIGS. 3 and 5-7. The toilet seat 500 further includes a housing outlet conduit 390 connected to (e.g., in fluid communication with) the housing 310 and the bidet wand housing 370. The bidet wand housing 370 may be the same as the bidet wand housing 370 described above with respect to FIG. 3. The toilet seat 500 further includes a gear assembly 320, cam 360, fastener 368, cam arm 365, pivot rod 376, and pivot rod supports 377, all of which may be the same as those described above with respect to FIGS. 3 and 5-7.

One or more components or elements of the toilet seat 500 may be integrally formed with the toilet seat oblong ring 510. For example, the pivot rod supports 377 and/or a portion of the housing 310 may be integrally formed on a bottom surface 520 of the oblong ring 510 as a single unitary body such that the bidet wand housing is rotatably coupled to the bottom surface 520. The housing 310, bidet wand housing 370, housing inlet conduit 380 and/or housing outlet conduit 390 may disposed below and/or coupled to the bottom surface 520 of the oblong ring 510. The housing 310, bidet wand housing 370, housing inlet conduit 380 and/or housing outlet conduit 390 may be coupled to the bottom surface 520 using an adhesive and/or one or more fasteners. The housing 310, housing inlet conduit 380, and/or housing outlet conduit 390 may be coupled to the oblong ring 510 during manufacturing of the bidet and oblong ring 510. In some examples, the pivot rod supports 377 may be coupled to the bottom surface 520 using an adhesive and/or one or more fasteners.

Figure 13:
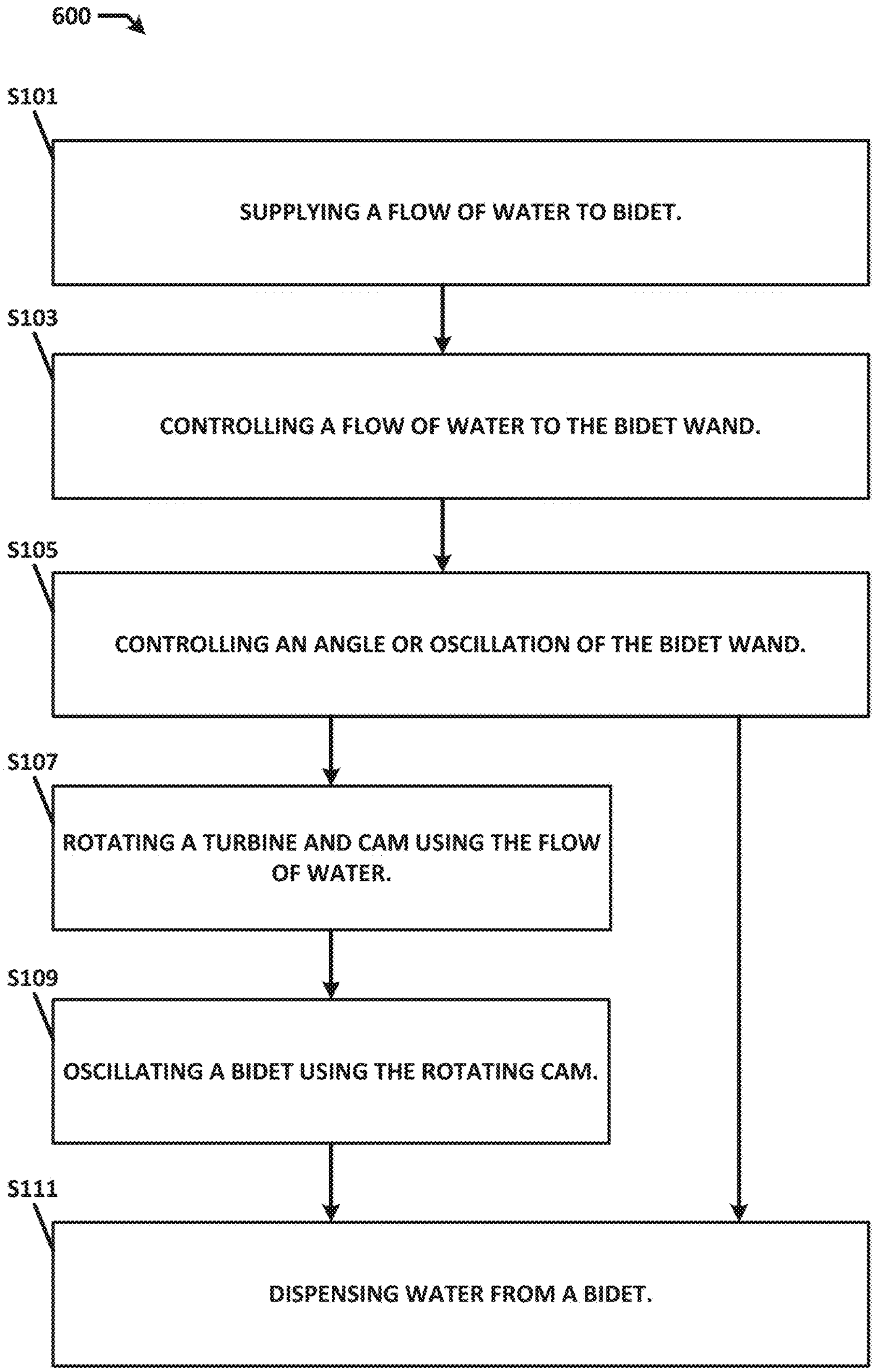
FIG. 13 illustrates a flow chart of oscillating a bidet according to an exemplary embodiment of the present disclosure.

FIG. 13 illustrates a flow chart 600 of oscillating a bidet according to an embodiment of the present disclosure. The bidet 300, bidet assembly 400, and toilet seat 500 may all employ the flow chart 600 of oscillating a bidet. Additional, different, or fewer acts may be provided.

At act S101, a flow of water is supplied to the bidet. The flow of water may be supplied to a first valve 420 of the bidet assembly by a supply conduit 410. The supply conduit 410 may be connected to the first valve 420 and a water supply. The water supply may be for example a reservoir within a tank of a toilet or a building water supply line.

At act S103 a flow of water to the bidet wand 375 is controlled by the first valve 420. The first valve 420 may be controlled or actuated by the first actuator 710. At act S103, the first valve 420 may be controlled to prevent the flow of water from passing through the first valve 420 corresponding to an off state of the bidet. Alternatively, the first valve 420 may be controlled to allow the flow of water or a portion of the flow of water to pass through the first valve 420. The first valve 420 may be operated to control a pressure, speed, and/or flow rate of water through the first valve 420, thus controlling on oscillation speed of the bidet wand 375.

At act S105, an angle and/or oscillation of the bidet wand 375 is controlled by the second valve 440. The second valve 440 may be controlled or actuated by the second actuator 720. At S105, the second valve may be controlled to divert the entire flow of water to the second conduit 460, and thus the housing 310, divert the entire flow to the bypass conduit 450, or divert a portion of the flow to the second conduit 460 and a portion of the flow to the bypass conduit 450. At act S103 when the entire flow is diverted to the second conduit 460 and the housing 310 the bidet wand 375 oscillated. At act S105 when the entire flow of water is diverted to the bypass conduit 450, the bidet wand 375 does not oscillate and remains in its current position. At act S105, when a portion of the flow of water is diverted to the second conduit 460 and a portion of the flow of water is diverted to the bypass conduit 450, the bidet wand 375 may oscillate more slowly than if the entire flow was diverted to the second conduit. The second valve 440 and second actuator 720 may be used to select an angle of the bidet wand 375 by diverting the entire flow of water to the bypass conduit at a selected angle during oscillation of the bidet wand 375.

At act S107, a turbine 331 and a cam 360 are rotated by the flow of water through the housing 310. When the flow of water or a portion of the flow of water flows to the second conduit 460 and thus housing 310, the water moves through the chamber 315 of the housing 310 from the housing inlet 311 to the housing outlet 312. As the housing 310 receives the flow of water, the flow of water may fill the chamber 315 and flow through the chamber 315 from the housing inlet 311 to the housing outlet 312. As water flows through the chamber 315, the water contacts the turbine 331 of the gear assembly 320, causing the first shaft 330 to rotate about an axis perpendicular to the flow of water through the chamber 315. The turbine 331 of the first shaft 330 is connected to the cam via the gear assembly (e.g., first shaft 330, second shaft 340, and third shaft 350). The gear assembly 320 is configured or operable to transfer or transmit kinetic energy (e.g., rotational energy) from the turbine 331 to the cam 360 as described above, causing the cam 360 to rotate.

At act S109, a bidet wand 375 oscillates using kinetic energy from the rotating cam 360. A cam arm 365 may be rotatably connected to each of the cam 360 and the bidet wand housing 370. The cam arm 365 may be rotatably coupled to the cam 360 via a fastener 368 that rotates around the cam axis of rotation as the cam 360 rotates. As the fastener 368 rotates, the fastener 368 may push and/or pull the cam arm 365. As the fastener 368 pushes and/or pulls the cam arm 365, the fastener may transfer kinetic energy to the cam arm, causing the cam arm to move. As the cam arm 365 moves, the cam arm 365 may push and/or pull the bidet wand housing 370. As the cam arm 365 pushes and/or pulls the bidet wand housing 370, the cam arm 365 may transfer kinetic energy to the bidet wand housing 370 and the bidet wand 375 causing the bidet wand 375 to move.

The fastener 368 may follow the same path around the cam axis of rotation each time that the fastener makes a rotation or revolution around the cam axis of rotation. Accordingly, the fastener 368 may push and/or pull the cam arm 365, such that the cam arm 365 follows the same path or occupies the same positions during each revolution of the fastener around the cam axis of rotation. Accordingly, the cam arm 365 may push and/or pull the bidet wand housing 370, such that the bidet wand 375 follows the same path or occupies the same position (i.e., oscillates) during each revolution of the fastener around the cam axis of rotation.

At act S111, the bidet wand 375 dispenses water. Specifically, the bidet wand 375 may dispense water from the wand outlet 378. A conduit or conduits, for example the housing outlet conduit 390 or third conduit 470 and fourth conduit 490 may be configured to direct the flow of water from the housing 310 to the bidet wand 375. Additionally, even if no portion of the flow of water passes through the housing 310, the flow of water may travel through the bypass conduit 450 to the fourth conduit 490 and to the bidet wand 375. The bidet wand 375 may dispense the flow of water from the wand outlet 378 as the bidet wand 375 oscillates between more than one use position.

When a component, device, element, or the like of the present disclosure is described as having a purpose or performing an operation, function, or the like, the component, device, or element should be considered herein as being "configured to" meet that purpose or to perform that operation or function.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An oscillating bidet comprising:

a housing configured to receive a flow of water, the housing including a housing inlet configured to receive the flow of water, a housing outlet configured to dispense the flow of water, and a chamber configured to direct the flow of water from the housing inlet to the housing outlet;

a gear assembly including a turbine disposed within the chamber of the housing; and a bidet wand configured to oscillate under the flow of water.

2. The oscillating bidet of claim 1, wherein the turbine is disposed within the chamber so as to rotate about an axis of rotation perpendicular to the flow of water through the chamber.

3. The oscillating bidet of claim 1, wherein the gear assembly further includes a cam disposed outside of the housing configured to rotate about a cam axis of rotation, wherein the gear assembly is configured to transmit rotational energy from the turbine to the cam.

4. The oscillating bidet of claim 3, further comprising:

a cam arm rotatably coupled to each of the cam and the bidet wand and configured to move with the cam as the cam rotates, oscillating the bidet wand.

5. An oscillating bidet assembly comprising:

a housing configured to receive a flow of water, the housing including a housing inlet configured to receive the flow of water, a housing outlet configured to dispense the flow of water, a chamber configured to direct the flow of water from the housing inlet to the housing outlet, and a gear assembly including a turbine disposed within the chamber, the gear assembly configured to rotate a cam as the flow of water moves through the housing;

a bidet wand having a wand outlet; and a cam arm having a first end coupled to the cam and a second end coupled to the bidet wand, the cam arm being configured to oscillate the bidet wand as the cam rotates.

6. The oscillating bidet assembly of claim 5, wherein the wand outlet is configured to dispense water as the bidet wand oscillates between more than one use position.

7. The oscillating bidet assembly of claim 5, further comprising:

a first valve configured to control a flow of water to the housing.

8. The oscillating bidet assembly of claim 7, further comprising:

a bypass conduit; and a second valve configured to selectively divert a flow of water to the bypass conduit.

9. A method of oscillating a bidet, the method comprising:

receiving a flow of water at a housing;

rotating a turbine disposed within the housing under the flow of water;

oscillating a bidet wand under the flow of water, the bidet wand oscillated between more than one use position; and dispensing water from the bidet wand as the bidet wand oscillates.

10. The method of claim 9, wherein the turbine is rotated about an axis of rotation perpendicular to the flow of water through the housing.

11. The method of claim 9, further comprising:

rotating a cam disposed outside of the housing using a gear assembly configured to transfer rotational energy from the turbine to the cam.

12. The method of claim 11, wherein the bidet wand is oscillated by a cam arm rotatably coupled to the each of the cam and a wand housing, the cam arm moving as the cam rotates and oscillating the bidet wand.

13. The method of claim 9, further comprising:

controlling a flow rate of water provided to the housing.

* * * * *